July 8, 1958

H. H. HOLLY 2,841,819

MOLDING APPARATUS

Filed Aug. 24, 1956

Inventor:
Harry H. Holly.
Schroeder, Hofgren,
By. Brady & Wegner.
Attorneys.

July 8, 1958 H. H. HOLLY 2,841,819
MOLDING APPARATUS
Filed Aug. 24, 1956 2 Sheets-Sheet 2
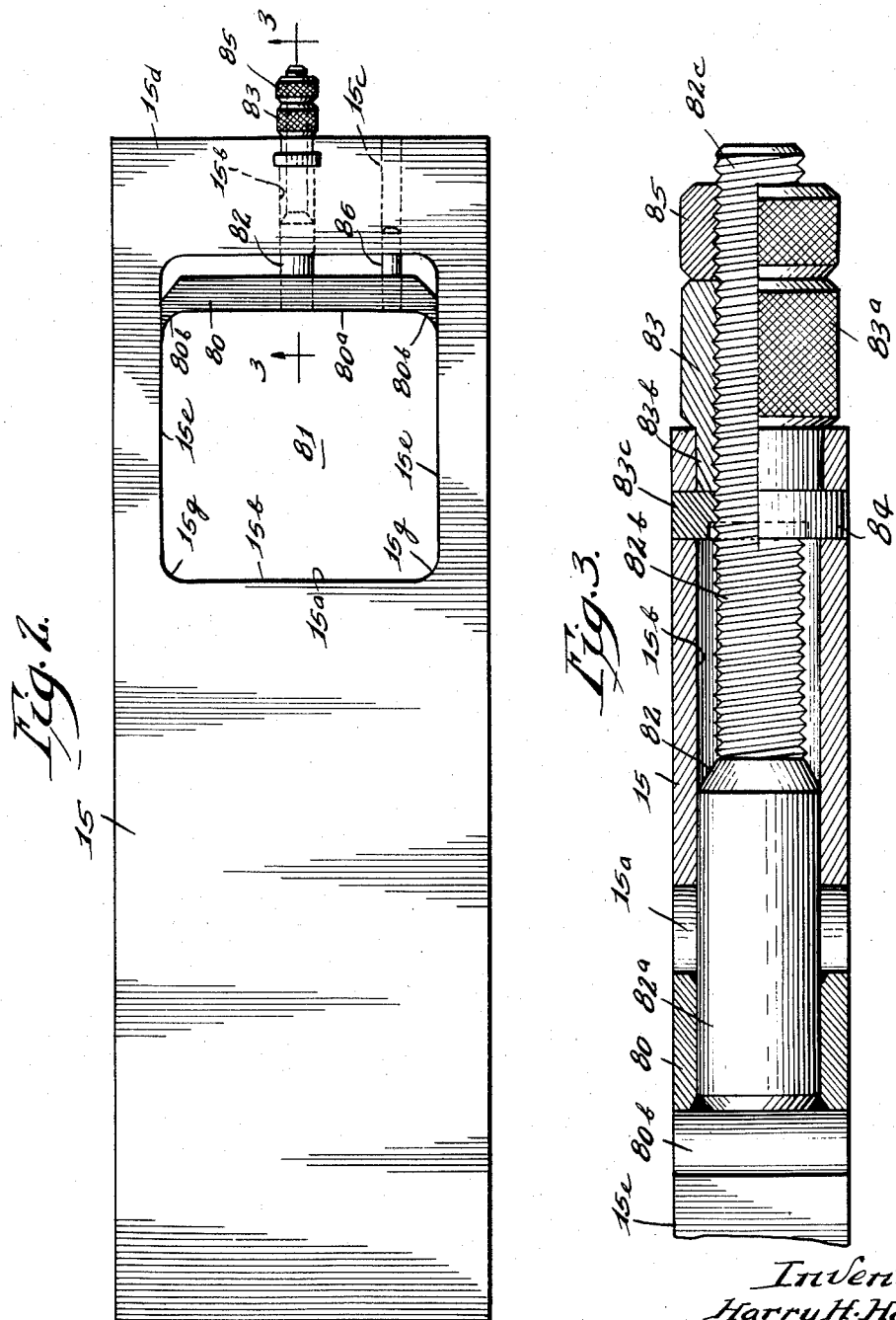

United States Patent Office 2,841,819
Patented July 8, 1958

2,841,819

MOLDING APPARATUS

Harry H. Holly, Olympia Fields, Ill., assignor to Hollymatic Corporation, a corporation of Illinois Application August 24, 1956, Serial No. 606,160

7 Claims. (Cl. 17—32)

This invention relates to a molding apparatus including a mold member having means forming a molding cavity therein in combination with means for adjusting or regulating the character, such as the capacity, of this molding cavity.

In certain types of molding devices, a mold having a mold cavity therein is used to form portions, and particularly patties, of flowable material, particularly finely divided food products such as ground meat, ground fish and the like.

Because finely divided products, and particularly ground food products, vary in consistency, density, moisture content, and the like, it has been found that often the weights of the patties from any given mold plate cavity will vary somewhat. As the weights and measures laws in many localities are quite strict and as the penalty for underweight is quite severe in many cases, it is important that precautions be taken to prevent underweight in the patties.

Similarly, it is desirable that excess weight in the patties be avoided because even a very small overweight of only a fraction of an ounce in each patty can total a considerable weight of excessive material during the course of a day due to the large number of patties that are customarily produced in the course of a day. For these reasons, it is necessary that the weight of every patty be controlled to very close tolerances. The present invention is intended to provide an adjustable feature so that the capacity of the mold cavity can be easily adjusted so as to give succeeding patties an exact predetermined weight regardless of the changes in consistency of succeeding batches of the material being molded.

One of the features of this invention, therefore, is to provide a molding apparatus comprising a mold member, a movable member operatively associated with the mold member, said members having cooperating surfaces defining a shaping cavity for a moldable material, and means operatively associated with the movable member for moving said movable member to alter the character of the cavity.

Another feature of the invention is to provide such a molding apparatus comprising a mold plate member having surfaces describing an opening therethrough, an elongated movable member in the opening of substantially the same thickness as the plate member, the movable member having a side surface facing the opening cooperating with said mold plate surfaces to describe a mold cavity, and adjusting means operatively engaging the movable member and the plate member and movable relative to the plate member for moving the movable member to alter the dimensions of the cavity.

Other features and advantages of the invention will be apparent from the following description of one embodiment thereof as illustrated in the accompanying drawings. Of the drawings:

Figure 2 is an enlarged plan view of the mold plate only of the apparatus; and

Figure 3 is an enlarged section taken substantially along line 3—3 of Figure 2.

Figure 1:
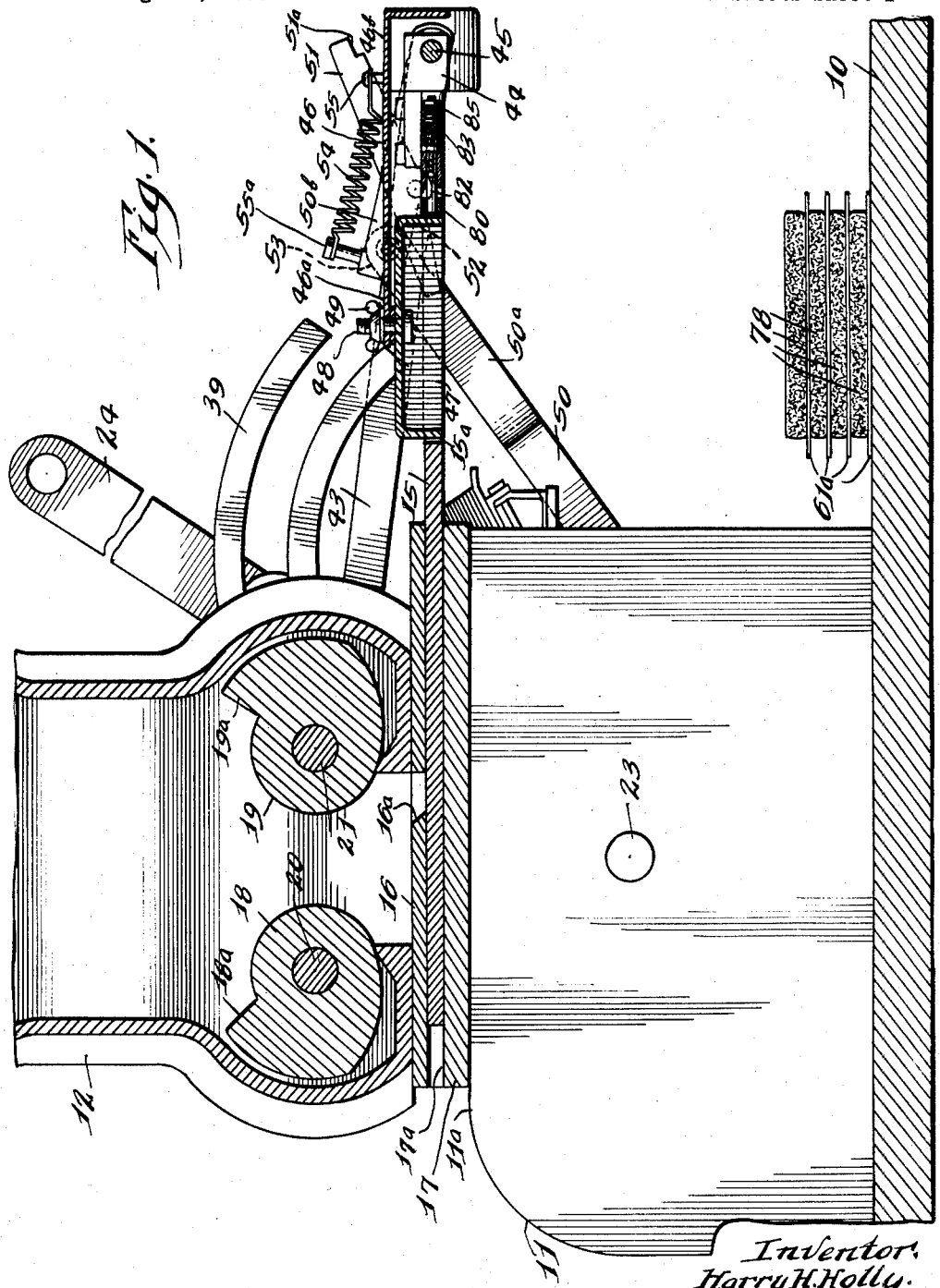
Figure 1 is a sectional elevation through substantially the longitudinal center of a molding apparatus embodying the invention.

The molding apparatus shown in the drawings, and particularly in Figure 1, is described and claimed in my U. S. Patent 2,757,412, dated August 7, 1956. This patent describes the structure in considerable detail and the disclosure of this patent is included specifically herein by reference.

The molding apparatus illustrated is adapted to rest on a base 10 and includes a lower casing 11 provided with a hopper 12 therein. This hopper is adapted to contain moldable material such as ground meat for making hamburger patties, sausage patties, fish patties, and the like.

Located between the bottom of the hopper 12 and the top 11a of the casing 11 is a substantially horizontal mold plate 15 having a mold opening 15a therein of rectangular or other desired shape. The mold plate is separated from the base of the hopper by an auxiliary plate 16 that is provided with an exit opening 16a therein adapted to communicate with the mold opening 15a so that material may be fed therethrough from the hopper into the mold opening in the customary manner. The mold plate 15 slides within the groove 17a of a second auxiliary plate 17 that rests on top of the casing 11. The provision of the second auxiliary plate 17 permits interchanging mold plates 15 of varying thicknesses and having different sized mold openings 15a so that a patty of a desired predetermined size may be produced.

In order to feed material from the hopper 12 through the opening 16a into the mold opening 15a, there is provided a pair of oscillatable feeders 18 and 19 mounted for oscillation on shafts 20 and 21, respectively. The feeder 18 is provided with a ram portion 18a and the feeder 19 is provided with a similar ram portion 19a. These ram portions are extended parts of the periphery of the feeders so as to provide a step construction. When the feeders are in the position shown in Figure 1 with the ram portions 18a and 19a furthest from the exit opening 16a, the feeders are in position preparatory to forcing material through this exit opening.

As is explained in detail in the above-mentioned Patent 2,757,412, the operating portions of the apparatus may in one embodiment be activated by means of a hand lever 24, which oscillates a shaft 23. The oscillation of the handle 24 operating through a lever 39 oscillates the feeders 18 and 19 and, by means of a rod 43, reciprocates the mold plate between the position where the mold opening 15a receives ground meat and the like and the position shown in Figure 1 where the patties are removed to fall onto the member 10 in a stack of patties 78 separated by sheets of paper 61a.

This outer end of the mold plate 15 is provided with a pair of brackets 44 at the edges thereof and extending beyond this end. Extending between the outer ends of these brackets is an axle 45 that is rotatably engaged by the linkage member 43 to reciprocate the mold plate 15. Rotatably mounted on this axle 45 is a holder 46 for a knock-out ring 47 adapted to enter the mold opening 15a and remove material therefrom. This holder 46 which is rotatably mounted on the axle 45 is provided with an extended portion 46a extending toward the hopper 12 with the innermost end of this portion adapted to have the knock-out member 47 removably attached thereto as by the bolt 48 and winged nut 49. The opposite end of the member 46 which is mounted on the axle 45 is provided with an outwardly extending flange portion 46b.

In order to raise the removing member or knockout ring 47 from the opening 15a, there is provided a toggle joint 50. One end 50a of this toggle joint is rotatably attached to the casing 11 and the other end 50b is rotatable on the axle 45 and located immediately beneath the flange 46b of the knock-out ring holder 46. The toggle joint 50 is so arranged that movement of the mold plate 15 to its retracted position with the mold opening 15a beneath the hopper exit opening 16a raises the toggle ends 50a and 50b. This raising of the toggle end 50b also raises the knock-out ring holder 46 because of the engagement of this toggle end 50b with the flange 46b.

In order to retain the knock-out ring 47 and its holder 46 in elevated position, there is provided a catch member 51 rotatably mounted on the linkage member 43 which moves the mold plate 15. This catch member is mounted for rotation about a bolt 52 and is so proportioned that the heavy end of the catch member is beyond this bolt resting on top of the flange 46b. The catch member 51 is provided with a cut-away catch portion 51a so positioned that it drops down behind the knock-out ring holder flange 46b when this flange has reached elevated position.

In order to disengage the catch member 51 from the flange 46b and permit the knock-out ring 47 to fall downwardly and knock the material from within the mold opening 15a, there is provided a knock-out pin 53 at the hinged connection of the toggle joint 50. This knock-out pin 53 is adapted to engage the light end of the catch member 51 beyond its pivot bolt 52 and rotate the catch member 51 in a counterclockwise direction as shown in Figure 1 in order that the flange 46b will be released. As soon as this flange is released, the knock-out ring holder 46 and thus the ring 47 falls forwardly so that the ring enters the opening 15a to knock molded material therefrom.

In order to accelerate the downward movement of the knock-out ring 47 and thus give the material within the mold opening 15a a sharp rap so that the material will be removed cleanly, there is provided a helical tension spring 54 extending between a post 55 on the flange 46b and a post 55a on the toggle end 50b. With this arrangement the movement of the toggle joint toward a position where the toggle ends are in alignment places increased tension on the spring 54. Therefore, at the moment when the catch member releases the ring holder, the spring is under its maximum tension and the knock-out ring is snapped sharply downwardly to remove the molded material from the opening 15a.

The mold plate 15 having a mold opening 15a adjacent to one end thereof is provided at this end with a pair of substantially parallel passages 15b and 15c. Each passage is of generally circular cross-section and both extend from one end 15d of the mold plate to the opening 15a. One passage 15b is larger than the other and is located substantially at the center of the mold plate. The other passage 15c is located closer to one edge of the mold plate.

Mounted in the essentially rectangular opening 15a adjacent to one end thereof is an elongated movable member 80. This movable member is of substantially the same thickness as the mold plate 15 and has its ends in sliding contact with the parallel side surfaces 15e of the opening 15a. The corners of the opening 15a, as indicated at 15g, are rounded. The surface 80a that faces the opening 15a and which defines one side of the mold cavity 81 is shaped similarly to the opposite surface 15h of the opening including the rounded corners 15g. Thus, as is shown most clearly in Figure 2, the ends 80b are curved toward the opposite surface 15h so that the mold plate surfaces 15e and 15h cooperate with the movable member surface 80a to describe a mold cavity with rounded corners. This, of course, is only one of many possible shapes of the mold cavity and is shown as generally rectangular purely for illustrative purposes.

The movable member 80 is movable in order to vary the capacity of the mold cavity 81. In order to provide for this movement, an adjusting means operatively engaging both the movable member and the plate member is provided. In the embodiment shown, this adjusting means includes a threaded bolt 82 located in the mold plate passage 15b and having its base 82a extending into and attached to the movable member 80 at about the center thereof. The threaded stem 82b is of reduced cross-sectional diameter and has one end 82c extending beyond the mold plate 15. This threaded end is engaged by a threaded nut 83 having a knurled portion 83a of generally circular cross-section located against the end 15d of the mold plate, a reduced intermediate section 83b located at the outer end of the passage 15b, and an enlarged flange portion 83c rotatably held within a laterally enlarged opening 84 extending from the passage 15b. The flange portion 83c serves to hold the nut against longitudinal movement along the bolt 82 when the nut 83 is rotated, thereby setting up longitudinal movement of the bolt 82 and thus the movable member 80. In order to lock the bolt 82 and thus the movable member 80 in adjusted position, an ordinary knurled lock nut 85 is provided on the end 82c of the bolt 82.

In order that the movable member 80 will not move from the opening 15a during adjustment movement thereof, the member 80 is provided with a rearwardly extending guide pin 86 which extends rearwardly from the movable member 80 into the mold plate passage 15c. With this arrangement, the combination of the bolt 82 engaging the passage 15b and the guide pin 86 engaging the passage 15c insures that the member 80 will always be in the plane of the mold plate 15 when the member 80 is in adjusted position and during adjustment thereof.

The molding apparatus shown operates in the manner explained in the above-mentioned Patent 2,757,412, in order to mold patties of ground meat and the like. The mold opening 81 in any given mold plate is arranged to produce a patty having a certain weight. Thus, there may be a series of mold plates of varying dimensions, with one intended to produce a two ounce patty, another a three ounce patty, another a four ounce patty, and the like. The mold plate described and claimed herein with the adjustment feature permits adjusting the size of the mold cavity 81 by properly positioning the movable member 80 so that the patties will always be of exact size regardless of the consistency, specific gravity, moisture content, and other characteristics of the material being molded. Thus, if it is found that the patties are underweight, it is only necessary to move the member 80 by rotating the nut 83 to enlarge the mold cavity to accommodate more molded material. Similarly, if it is found that the patty is overweight, the size of the mold cavity 81 may be reduced by making a corresponding adjustment in the movable member 80.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. Molding apparatus, comprising: a mold plate member having top and bottom surfaces, the member being relatively thin with respect to its length and width and having surfaces extending between said top and bottom surfaces defining an opening through the mold plate member; an elongated movable member in said opening of substantially the same thickness as said plate member normally located at one side of the opening and having a side surface facing said opening and cooperating therewith to define a mold cavity, the movable member having its top and bottom surfaces substantially in the same planes as the corresponding surfaces of said plate member; means for moving the movable member within the opening to vary the size of the cavity; and means for guiding said movement to maintain said co-planar relationship of said top and bottom surfaces.

2. Molding apparatus, comprising: a mold plate member having top and bottom surfaces, the member being relatively thin with respect to its length and width and having surfaces extending between said top and bottom surfaces defining an opening through the mold plate member, the opening defining surfaces being smoothly blended into each other to provide rounded contours; an elongated movable member in said opening of substantially the same thickness as said plate member normally located at one side of the opening and having a side surface facing said opening and cooperating therewith to define a mold cavity, said side surface having its ends smoothly blended into said opening defining surfaces in order to constitute a continuation of said rounded contours, the movable member having its top and bottom surfaces substantially in the same planes as the corresponding surfaces of said plate member; means for moving the movable member within the opening to vary the size of the cavity; and means for guiding said movement to maintain said coplanar relationship of said top and bottom surfaces.

3. Molding apparatus, comprising: a mold plate member having top and bottom surfaces, the member being relatively thin with respect to its length and width and having surfaces extending between said top and bottom surfaces defining an opening through the mold plate member; an elongated movable member in said opening of substantially the same thickness as said plate member normally located at one side of the opening and having a side surface facing said opening and cooperating therewith to define a mold cavity, the movable member having its top and bottom surfaces substantially in the same planes as the corresponding surfaces of said plate member; a pair of substantially parallel rod members in said movable member, said plate member having substantially parallel passages between said top and bottom surfaces in which said rod members are movably positioned for guiding the movement of said elongated movable member within said plate member opening to maintain said coplanar relationship of said top and bottom surfaces; and means for moving the movable member within the opening to vary the size of the cavity.

4. Molding apparatus, comprising: a mold plate member having top and bottom surfaces, the member being relatively thin with respect to its length and width and having surfaces extending between said top and bottom surfaces defining an opening through the mold plate member; an elongated movable member in said opening of substantially the same thickness as said plate member normally located at one side of the opening and having a side surface facing said opening and cooperating therewith to define a mold cavity, the movable member having its top and bottom surfaces substantially in the same planes as the corresponding surfaces of said plate member; a pair of substantially parallel rod members on said movable member, said plate member having substantially parallel passages between said top and bottom surfaces in which said rod members are movably positioned for guiding the movement of said elongated movable member within said plate member opening to maintain said coplanar relationship of said top and bottom surfaces; and means on one of said rod members engaging said plate member for moving the one rod member in its passage and thereby the other rod member in its passage and the movable member within the opening to vary the size of the cavity.

5. Molding apparatus, comprising: a mold plate member having top and bottom surfaces, the member being relatively thin with respect to its length and width and having surfaces extending between said top and bottom surfaces defining an opening through the mold plate member, the opening defining surfaces being smoothly blended into each other to provide rounded contours; an elongated movable member in said opening of substantially the same thickness as said plate member normally located at one side of the opening and having a side surface facing said opening and cooperating therewith to define a mold cavity, said side surface having its ends smoothly blended into said opening defining surfaces in order to constitute a continuation of said rounded contours, the movable member having its top and bottom surfaces substantially in the same planes as the corresponding surfaces of said plate member; a pair of substantially parallel rod members on said movable member, said plate member having substantially parallel passages between said top and bottom surfaces in which said rod members are movably positioned for guiding the movement of said movable member within said plate member opening to maintain said coplanar relationship of said top and bottom surfaces; and means on one of said rod members engaging said plate member for moving the one rod member in its passage and thereby the other rod member in its passage and the movable member within the opening to vary the size of the cavity.

6. Molding apparatus, comprising: a mold plate member having top and bottom surfaces, the member being relatively thin with respect to its length and width and having surfaces extending between said top and bottom surfaces defining an opening through the mold plate member, the opening defining surfaces being smoothly blended into each other to provide rounded contours and the opening being located adjacent to one end of the plate member; an elongated movable member in said opening adjacent to said one end of the plate member of substantially the same thickness as said plate member normally located at one side of the opening and having a side surface facing said opening and cooperating therewith to define a mold cavity, said side surface having its ends smoothly blended into said opening defining surfaces in order to constitute a continuation of said rounded contours, the movable member having its top and bottom surfaces substantially in the same planes as the corresponding surfaces of said plate member; a pair of substantially parallel rod members on said movable member, said plate member having substantially parallel passages between said top and bottom surfaces in which said rod members are movably positioned for guiding the movement of said movable member within said plate member opening to maintain said coplanar relationship of said top and bottom surfaces, said parallel passages extending between said opening and said one end of the plate member; and means on one of said rod members engaging said plate member for moving the one rod member in its passage and thereby the other rod member in its passage and the movable member within the opening to vary the size of the cavity.

7. Molding apparatus, comprising: a mold plate member having top and bottom surfaces, the member being relatively thin with respect to its length and width and having surfaces extending between said top and bottom surfaces defining an opening through the mold plate member, the opening defining surfaces being smoothly blended into each other to provide rounded contours and the opening being located adjacent to one end of the plate member; an elongated movable member in said opening adjacent to said one end of the plate member of substantially the same thickness as said plate member normally located at one side of the opening and having a side surface facing said opening and cooperating therewith to define a mold cavity, said side surface having its ends smoothly blended into said opening defining surfaces in order to constitute a continuation of said rounded contours, the movable member having its top and bottom surfaces substantially in the same planes as the corresponding surfaces of said plate member; a pair of substantially parallel rod members on said movable member, said plate member having substantially parallel passages between said top and bottom surfaces in which said rod members are movably positioned for guiding the movement of said movable member within said plate member opening to maintain said coplanar relationship of said top and bottom surfaces, said parallel passages extending between said opening and said one end of the plate member; and means including a nut rotatably held on one of said rod members and engaging said plate member for moving the one rod member in its passage and thereby the other rod member in its passage and the movable member within the opening to vary the size of the cavity, the nut having a maximum thickness not substantially greater than the thickness of said plate member.

References Cited in the file of this patent

UNITED STATES PATENTS

| | | |
|---|---|---|
| 834,617 | Hall | Oct. 30, 1906 |
| 1,490,937 | Pedersen | Apr. 22, 1924 |
| 1,749,178 | Berg | Mar. 4, 1930 |
| 2,228,644 | Sackas | Jan. 14, 1941 |
| 2,574,831 | Jameson et al. | Nov. 13, 1951 |